US012413011B2

(12) United States Patent
Ishikawa

(10) Patent No.: US 12,413,011 B2
(45) Date of Patent: Sep. 9, 2025

(54) CONNECTOR HAVING A BASE INCLUDING A PARTITION WALL BETWEEN ADJACENT TERMINALS WHICH HAVE NON-PLATED PORTIONS PARTIALLY DISPOSED WITHIN THE BASE

(71) Applicant: TOYOTA JIDOSHA KABUSHIKI KAISHA, Aichi-ken (JP)

(72) Inventor: Yujiro Ishikawa, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 426 days.

(21) Appl. No.: 18/079,877

(22) Filed: Dec. 13, 2022

(65) Prior Publication Data

US 2023/0261414 A1 Aug. 17, 2023

(30) Foreign Application Priority Data

Feb. 17, 2022 (JP) ................................ 2022-023203

(51) Int. Cl.
*H01R 13/533* (2006.01)

(52) U.S. Cl.
CPC .................................. *H01R 13/533* (2013.01)

(58) Field of Classification Search
CPC .................................................... H01R 13/533
USPC .......................................................... 439/519
See application file for complete search history.

(56) References Cited

U.S. PATENT DOCUMENTS 4,561,714 A * 12/1985 Byczek .................. H01R 12/68 439/422
6,375,492 B1 * 4/2002 Hio .................... H01R 13/4361 439/495
6,746,269 B1 * 6/2004 Casses ................. H01R 4/2495 439/422
7,338,310 B2 * 3/2008 Kumakura ............. H01R 12/67 439/422
7,462,062 B2 * 12/2008 Kumakura ............. H01R 4/182 439/877
7,581,979 B2 * 9/2009 Kumakura ............. H01R 12/69 174/117 FF
8,052,477 B1 * 11/2011 Ko ......................... H01R 27/00 439/660
8,282,403 B2 * 10/2012 Sawai .................. H01R 12/714 439/79
8,672,704 B2 * 3/2014 de Bruijn ............... H01R 12/68 439/422
8,702,443 B2 * 4/2014 Kajiura .................. H01R 12/68 439/422

(Continued)

FOREIGN PATENT DOCUMENTS

JP 2014060099 A 4/2014
JP 2014209836 A 11/2014
JP 2019-102220 A 6/2019

*Primary Examiner* — Harshad C Patel
(74) *Attorney, Agent, or Firm* — HAUPTMAN HAM, LLP

(57) ABSTRACT

A connector includes a base and a plurality of terminals, each of the terminals includes a plated portion in which a base material is covered with a film and a non-plated portion in which the base material is not covered with a film, the non-plated portion is disposed within the base, a portion of the non-plated portion is exposed from the surface of the base, and the base includes a partition wall that protrudes from the surface of the base between two adjacent terminals among the terminals.

20 Claims, 7 Drawing Sheets

(56) References Cited

U.S. PATENT DOCUMENTS

| | | | | |
|---|---|---|---|---|
| 9,004,957 | B2 * | 4/2015 | Aizawa | H01R 13/6473 439/876 |
| 9,225,096 | B2 * | 12/2015 | Crofoot | H01R 13/405 |
| 9,325,089 | B2 * | 4/2016 | Ito | H01R 12/70 |
| 9,431,720 | B2 * | 8/2016 | Ito | H01R 43/048 |
| 9,640,880 | B2 * | 5/2017 | Tran | H01R 13/65915 |
| 10,431,906 | B1 * | 10/2019 | Reed | H01B 7/0045 |
| 10,440,998 | B2 * | 10/2019 | Polloni | A24F 40/42 |
| 10,950,963 | B2 * | 3/2021 | Veihl | H01R 12/778 |
| 11,245,220 | B2 * | 2/2022 | Ebata | H01R 13/506 |
| 11,289,841 | B2 * | 3/2022 | Ikegami | H01R 12/88 |
| 11,349,226 | B2 * | 5/2022 | Yan | H01M 50/503 |
| 11,814,719 | B2 * | 11/2023 | Ikenaga | C23C 16/04 |
| 12,011,028 | B2 * | 6/2024 | Capelli | A24F 40/46 |
| 2012/0100750 | A1 * | 4/2012 | Nomura | H01R 12/613 439/492 |
| 2015/0194762 | A1 | 7/2015 | Fukuda et al. | |

* cited by examiner

CONNECTOR HAVING A BASE INCLUDING A PARTITION WALL BETWEEN ADJACENT TERMINALS WHICH HAVE NON-PLATED PORTIONS PARTIALLY DISPOSED WITHIN THE BASE

CROSS-REFERENCE TO RELATED APPLICATION

This application claims priority to Japanese Patent Application No. 2022-023203 filed on Feb. 17, 2022, incorporated herein by reference in its entirety.

BACKGROUND

1. Technical Field

The present disclosure relates to a connector with a plurality of terminals.

2. Description of Related Art

Japanese Unexamined Patent Application Publication No. 2014-209836 (JP 2014-209836 A) discloses a power conversion device mounted on a vehicle. In the power conversion device, a plurality of terminals is disposed to be spaced apart from each other.

SUMMARY

With the above technology, condensation may occur around the terminal depending on the state and environment of a vehicle. Each of the terminals is subjected to plating for forming a film to improve corrosion resistance. However, in the terminal manufacturing process, there are cases where a process is employed in which a non-plated portion where no film is disposed is formed on the surface of the terminal. In this case, when condensation adheres to the non-plated portions of two adjacent terminals, corrosion due to electrolytic corrosion may occur in the non-plated portions.

The present disclosure provides a technique for suppressing the occurrence of electrolytic corrosion in a plurality of terminals having non-plated portions.

A first aspect of the present disclosure relates to a connector including a base and a plurality of terminals. The terminals are held by the base and protruding from a surface of the base, the terminals being disposed to be spaced apart from each other. Each of the terminals includes a plated portion in which a base material is covered with a film and a non-plated portion in which the base material is not covered with a film and the non-plated portion is disposed within the base. A portion of the non-plated portion is exposed from the surface of the base. The base includes a partition wall that protrudes from the surface of the base between two adjacent terminals among the terminals.

According to the first aspect of the present disclosure, it is possible to separate the non-plated portions of the two adjacent terminals by the partition wall. As a result, even when condensation adheres to the surface of the base, it is possible to restrain the condensation from adhering to the non-plated portions of the two adjacent terminals by the partition wall extending from the surface of the base. Accordingly, electrolytic corrosion in the non-plated portion can be suppressed.

In the first aspect of the present disclosure, the height of the partition wall from the surface of the base may be equal to or greater than a distance between the two adjacent terminals.

According to the first aspect of the present disclosure, in a situation where condensation adheres to the surface of the base, the condensation may be formed in a hemispherical shape. By setting the height of the partition wall to be equal to or greater than the distance between the adjacent terminals, it is possible to restrain the condensation from running over the partition wall and contacting both adjacent connectors.

In the first aspect of the present disclosure, a tip of the partition wall may be formed with a curved surface.

According to the first aspect of the present disclosure, it is possible to restrain condensation from accumulating on the upper end of the partition wall.

The connector according to the first aspect of the present disclosure may further include a resin covering portion that is disposed on the surface of the base and covers a portion of the non-plated portion exposed from the surface of the base.

According to the first aspect of the present disclosure, it is possible to suppress contact of condensation with the non-plated portion. Accordingly, it is possible to suppress the occurrence of corrosion in the non-plated portion.

In the first aspect of the present disclosure, in each of the terminals, the plated portion may get inclined downward at a portion that is further away from the base than the non-plated portion.

In the first aspect of the present disclosure, the plated portions of the terminals may extend obliquely with respect to the base.

A second aspect of the present disclosure relates to a connector including a base and a plurality of terminals held by the base and protruding from a surface of the base, the terminals being disposed to be spaced apart from each other. Each of the terminals includes a plated portion in which a base material is covered with a film and a non-plated portion in which the base material is not covered with a film. The non-plated portion is disposed to be spaced apart from the base.

According to the second aspect of the present disclosure, it is possible to restrain condensation adhering to the surface of the base from coming into contact with the non-plated portion. As a result, it is possible to suppress occurrence of the situation where condensation adheres to the non-plated portions of two adjacent terminals. Accordingly, electrolytic corrosion in the non-plated portion can be suppressed.

In the second aspect of the present disclosure, a distance from the surface of the base to the non-plated portion may be equal to or greater than a distance between the non-plated portions of the two adjacent terminals.

According to the second aspect of the present disclosure, in a situation where condensation adheres to the surface of the base, the condensation may be formed in a hemispherical shape. By setting the distance from the surface of the base to the non-plated portion to be equal to or greater than the distance between the adjacent terminals, it is possible to suppress contact of the condensation adhering to the surface of the base with the non-plated portion.

In the second aspect of the present disclosure, in each of the terminals, the plated portion may get inclined downward at a portion that is further away from the base than the non-plated portion.

According to the second aspect of the present disclosure, it is possible to promote condensation adhering to the plated portion to run along the downwardly inclined plated portion to move to the opposite side of the non-plated portion.

In the second aspect of the present disclosure, the plated portions of the terminals may extend obliquely with respect to the base.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The technical elements of a connector that are aspects of the present disclosure are listed below. Each of the following technical elements is independently useful.

First Embodiment

Figure 1:
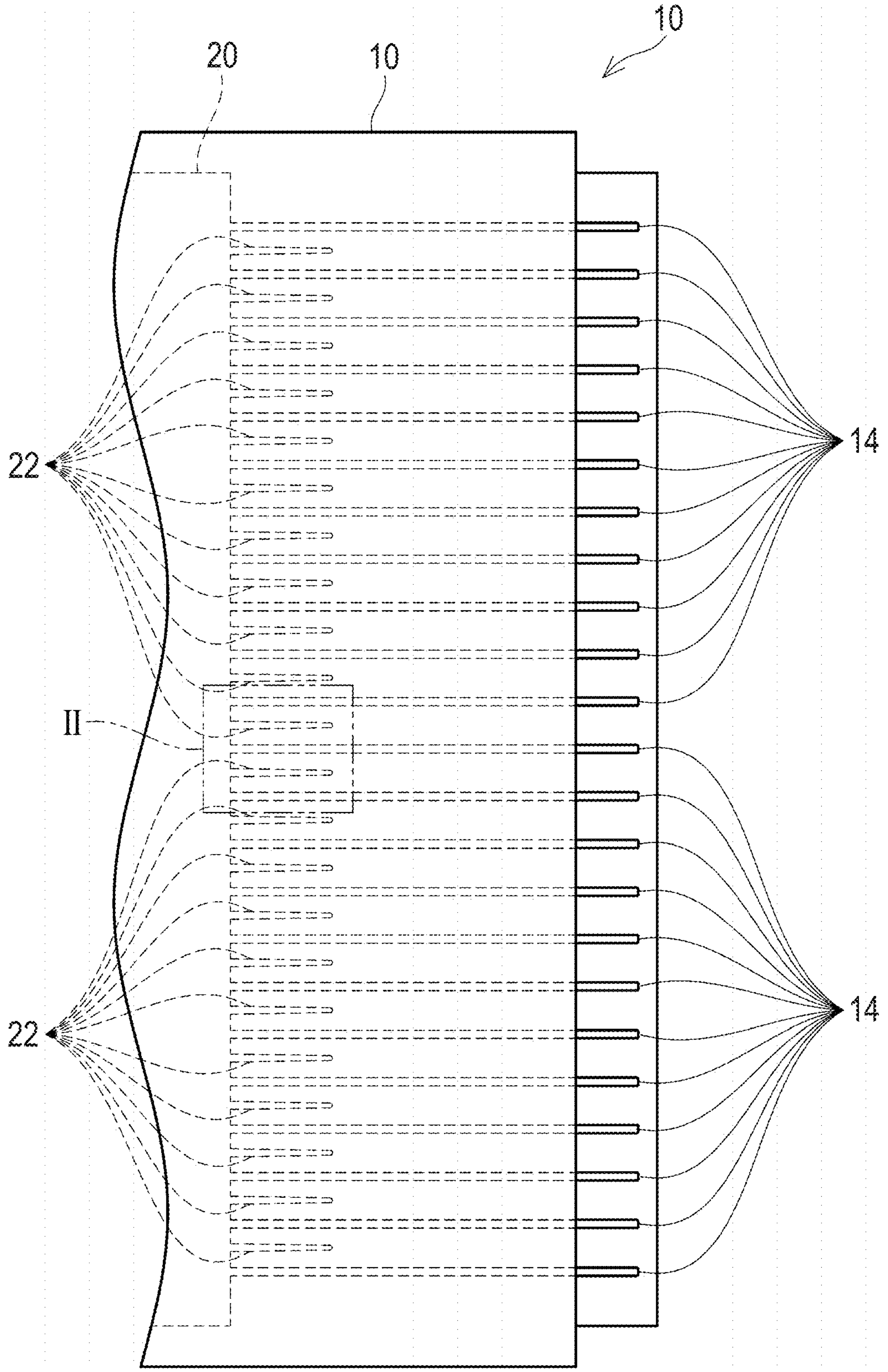
FIG. 1 is a plan view of a connector of a first embodiment.

As shown in FIG. 1, a connector 10 of the present embodiment is used for electrical connection of devices mounted on a battery electric vehicle. For example, the connector 10 is a connector that is disposed in a charger (that is, an electric vehicle (EV) charger) for charging a battery mounted on the battery electric vehicle and is connected to an in-vehicle wire for supplying power from an external power supply. The connector 10 may be used for devices other than the battery electric vehicle.

The connector 10 is disposed in a device (not shown). The connector 10 includes a cover 12, a plurality of terminals 14, and a base 20. In the following, the term "terminals 14" is used to collectively represent the "plurality of terminals 14", and the term "terminal 14" is used to represent "any one of the plurality of terminals 14". The terminals 14 have the same configuration as each other. The terminals 14 are arranged side by side at regular intervals. The terminal 14 is made of a conductive metal, such as a copper alloy, for example. The terminal 14 extends linearly. The terminals 14 are connected to a board (not shown) in a state of being held by the base 20. The base 20 is made of insulating resin. The terminals 14 are fixed by being press-fitted into the base 20.

The terminals 14 and the base 20 are covered with the cover 12. Some of the tips of the terminals 14 are exposed from the cover 12. The cover 12 is attached to the device with the connector 10.

Figure 2:
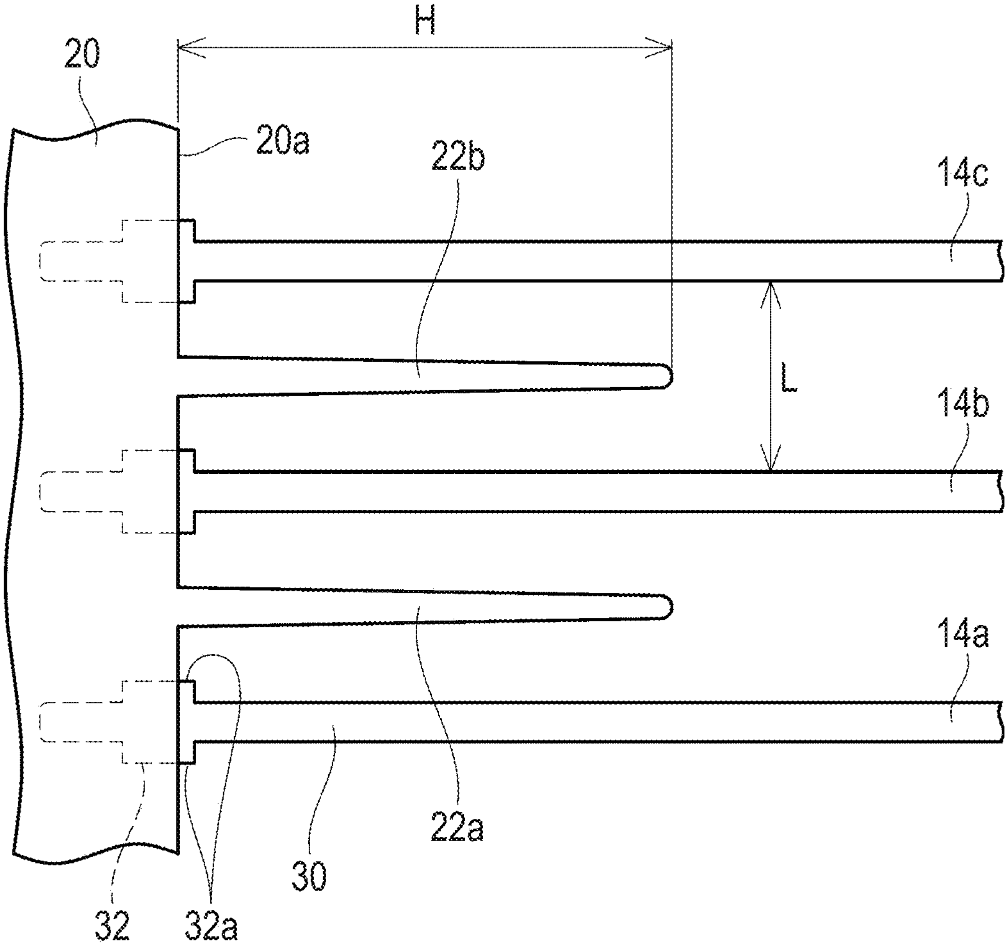
FIG. 2 is an enlarged view of a region II of FIG. 1.

FIG. 2 shows an enlarged view of three terminals 14*a*, 14*b*, 14*c* around a surface 20*a* of the base 20, among the terminals 14. In addition, hereinafter, when each terminal 14 of the terminals 14 is described, the terminal is represented as "terminal 14", and when specifying one of the terminals 14*a*, 14*b*, 14*c*, is described, the terminal is represented as "terminal 14*a*", "terminal 14*b*", or "terminal 14*c*". The terminal 14 includes a plated portion 30 and a non-plated portion 32. The non-plated portion 32 is disposed at an intermediate position in a longitudinal direction of the terminal 14. The intermediate position is a position that does not include both ends in the longitudinal direction of the terminal 14 (that is, a right and left direction in FIG. 2).

A plated portion 30 is disposed at each of both ends of the non-plated portion 32 in the longitudinal direction of the terminal 14. The plated portion 30 extends linearly. The non-plated portion 32 has a wider shape than the plated portion 30. The entire outer surface of the plated portion 30 is covered with a corrosion-resistant thin film. The thin film covering the plated portion 30 is made of a highly corrosion-resistant material, such as gold (Au) or nickel (Ni). The material of the plated portion 30 may be different across the non-plated portion 32. For example, the portion of the plated portion 30 exposed from the surface 20*a* of the base 20 may be covered with a gold (Au) thin film, whereas the portion buried in the base 20 may be covered with a nickel (Ni) thin film.

On the other hand, the non-plated portion 32 is covered with a corrosion-5 resistant thin film like the plated portion 30, except both end surfaces 32*a* located in a lateral direction perpendicular to the longitudinal direction of the terminal 14 (that is, a vertical direction in FIG. 2). The end surfaces 32*a* are not covered with a thin film, and the base material of the terminal 14 is exposed.

Next, a method for manufacturing the terminal 14 will be described. First, a flat plate is cut out by pressing. The terminals 14 after pressing are arranged in a row in the lateral direction of the terminals 14 and are connected to the adjacent terminals 14 at the non-plated portions 32. Next, plating is performed while in a state in which the terminals 14 are connected to each other. Then, the non-plated portion 32 between the terminals 14 adjacent to each other is cut in parallel with the longitudinal direction. Accordingly, the terminal 14 is produced. In the manufacturing method, the non-plated portion 32 is cut after plating, and accordingly, the end surfaces 32*a* of the non-plated portion 32 are not plated and the material of the terminal 14 is exposed.

As shown in FIG. 2, a portion of the end surface 32*a* is exposed from the surface 20*a* of the base 20.

A partition wall 22*a* extending along the terminals 14*a*, 14*b* protrudes from the surface 20*a* of the base 20 between the terminals 14*a*, 14*b* adjacent to each other. The partition wall 22*a* is disposed in the center of a gap between the terminals 14*a*, 14*b*. The partition wall 22*a* is produced by integral molding with the base 20. The partition wall 22*a* extends linearly in a specific direction perpendicular to the longitudinal direction and the lateral direction of the terminal 14*a* (that is, direction perpendicular to the paper surface of FIG. 2) with the shape being maintained in the specific direction. The partition wall 22*a* extends over a section in which the terminals 14*a*, 14*b* are disposed in a specific direction.

The width of the partition wall 22*a* in the lateral direction of the terminal 14 gradually narrows as the distance in the longitudinal direction thereof becomes further away from the base 20. A tip of the partition wall 22*a* is formed with a curved surface and does not have a flat portion. A height H of the partition wall 22*a* in the longitudinal direction is equal to or greater than an interval L between the terminals 14*a*, 14*b*. In addition, the height H may be, for example, 1.0 mm or more.

A partition wall 22*b* similar to the partition wall 22*a* is disposed between the terminal 14*b* and the terminal 14*c*. As shown in FIG. 1, a partition wall 22 similar to the partition wall 22*a* is disposed between two terminals 14 adjacent to each other among the terminals 14. That is, the base 20 is provided with a plurality of partition walls 22 protruding from the surface 20*a*.

Condensation adheres to the connector 10 depending on the usage situation the surrounding environment. For example, moisture absorbed in a board to which the terminals 14 are connected is discharged from the board as the temperature of the board rises and turns into condensation. When condensation occurs, the condensation may adhere to the surface 20*a* of the base 20. When the condensation adheres to the surface 20*a*, the end surface 32*a* of the non-plated portion 32 is exposed to the condensation. The partition wall 22 is disposed in the connector 10. With the above configuration, it is possible to restrain the end surfaces 32*a* of the terminals 14 adjacent to each other (for example, the terminals 14*a*, 14*b*) from being electrically connected through moisture of the condensation. Accordingly, it is possible to restrain the terminal 14 from being corroded by electrolytic corrosion.

The height H of the partition wall 22 is greater than the interval L between the terminals 14 adjacent to each other. With the above configuration, it is possible to suppress the water droplets of condensation adhering to the surface 20*a* from crossing the partition wall 22. For example, when the water droplets adhering to the surface 20*a* are formed in a hemispherical shape, at the maximum, the water droplet has a hemispherical shape with a diameter equal to the distance between the partition walls 22 adjacent to each other, that is, the interval L, and the height of the water droplet is L/2. Therefore, by setting the partition wall 22 to at least twice the maximum height of the water droplet, it is possible to reliably restrain the water droplet from running over the partition wall 22.

The tip of the partition wall 22 is formed with a curved surface. With the above configuration, it is possible to restrain moisture due to condensation from accumulating at the tip of the partition wall 22.

The partition walls 22 are separated from each other and are not connected except for the base 20. Accordingly, it is possible to restrain the moisture accumulated between the adjacent partition walls 22 from remaining between the adjacent partition walls 22.

Second Embodiment

Figure 3:
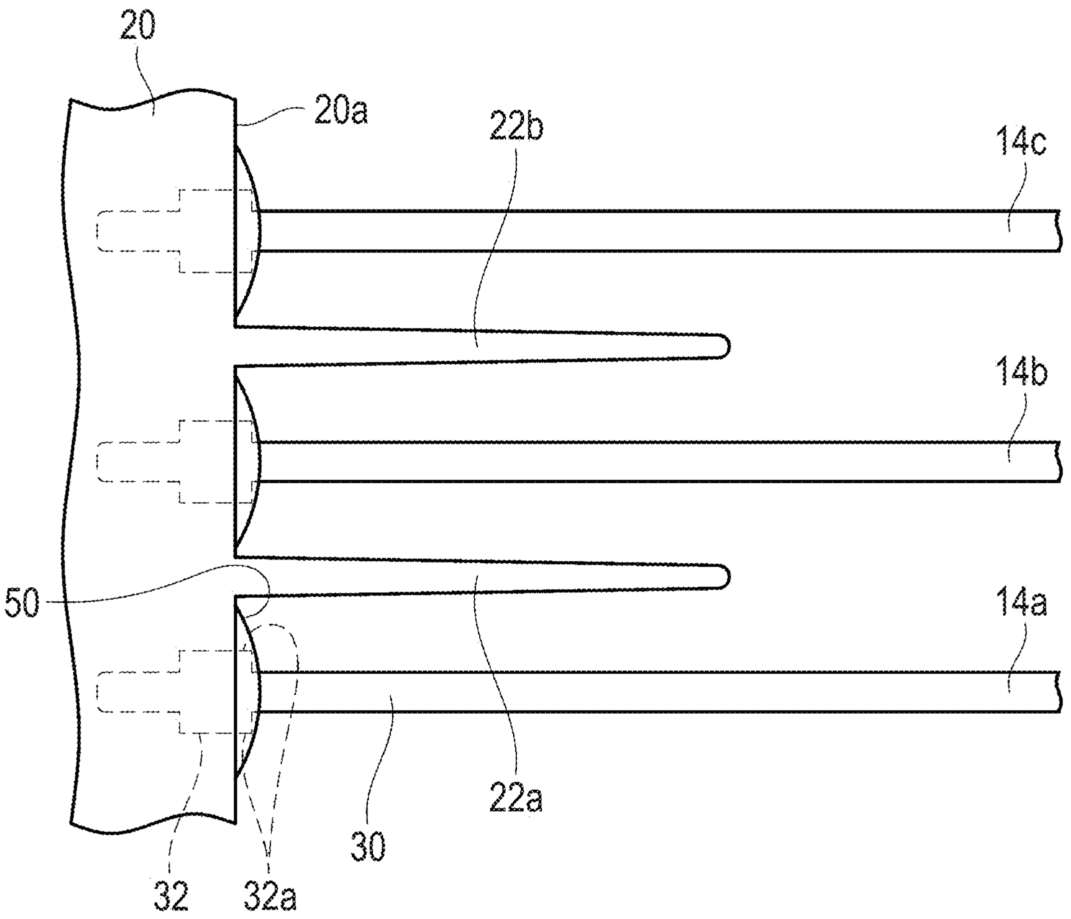
FIG. 3 is an enlarged view of a region II of a connector of a second embodiment.

As shown in FIG. 3, in a connector of the present embodiment, a covering portion 50 is disposed on the surface 20*a* of the base 20 to cover the non-plated portion 32 of each of the terminals 14. Other configurations of the connector 10 are the same as those of the connector 10 of the first embodiment. The covering portion 50 is made of a resin material, such as polybutylene terephthalate (that is, PBT). For example, the covering portion 50 may be produced by potting the non-plated portions 32 of the terminals 14 from the state shown in FIG. 2.

With the above configuration, effects similar to the effects of the connector 10 of the first embodiment can be obtained. Further, with the configuration, the covering portion 50 can restrain the non-plated portion 32 from being exposed to the outside of the connector 10. Accordingly, corrosion of the non-plated portion 32 is suppressed.

In a modification example, for example, of two adjacent terminals 14, a first terminal 14 may be provided with the covering portion 50 and a second terminal 14 may not be provided with the covering portion 50 such that the terminal 14*a* is provided with the covering portion 50, the terminal 14*b* is not provided with the covering portion 50, and the terminal 14*c* is provided with the covering portion 50. In the configuration, the terminals 14 on which the covering portions 50 are disposed and the terminals 14 on which the covering portions 50 are not disposed may be alternately disposed in the direction in which the terminals 14 are disposed. With the configuration, it is possible to restrain the non-plated portions 32 of two adjacent terminals 14 from being electrically connected to each other due to moisture of condensation.

Third Embodiment

Figure 4:
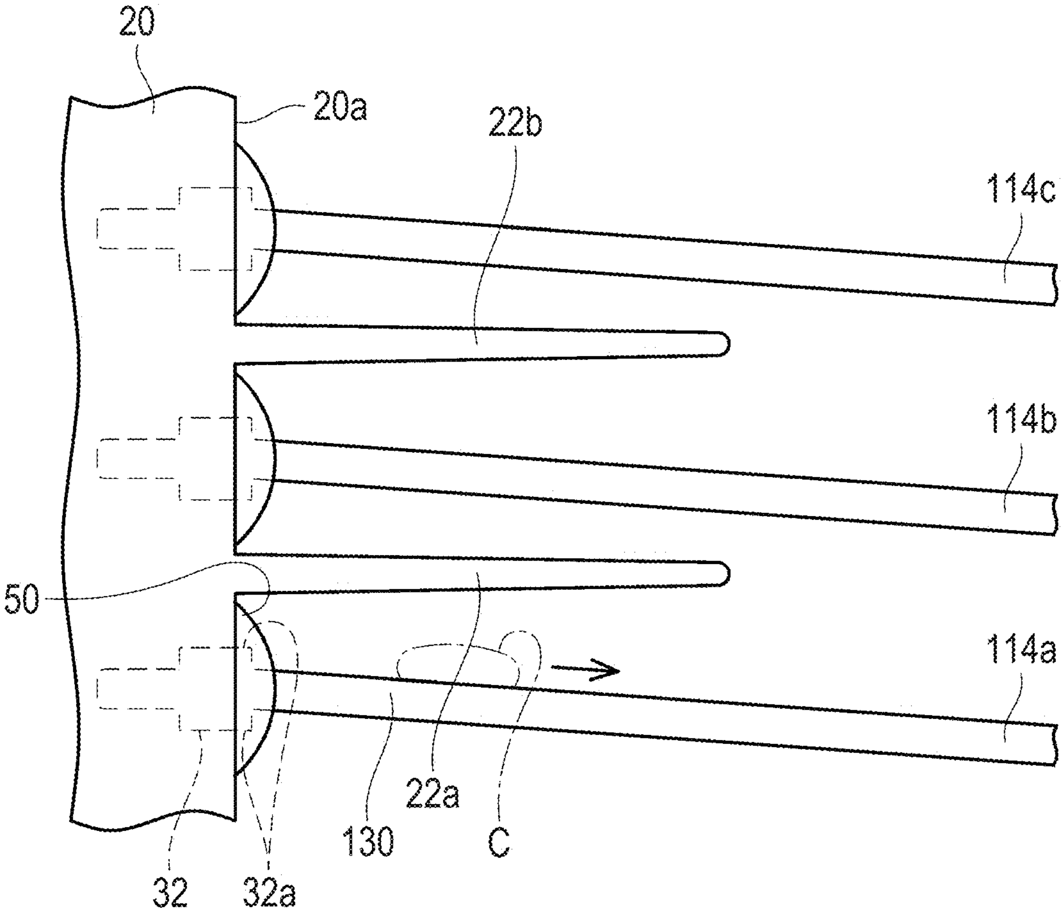
FIG. 4 is an enlarged view of a region II of a connector of a third embodiment.

As shown in FIG. 4, in a connector of the present embodiment, a plurality of terminals 114 are disposed in place of the terminals 14 as compared with the connector of the second embodiment. The terminal 114 includes a non-plated portion 32, which is similar to the non-plated portion of the terminal 14, and a plated portion 130 extending from each of both ends of the non-plated portion 32 in a longitudinal direction of the terminal 114. The plated portion 130 extends obliquely with respect to the base 20. In FIG. 4, the portion of the plated portion 130 that is further away from the base 20 than the non-plated portion 32 gets inclined downward as the distance from the non-plated portion 32 increases. All terminals 114 disposed on the connector, including terminals 114*a*, 114*b*, 114*c*, have similar configurations to each other. Other configurations are the same as the configurations of the connector 10 of the second embodiment.

With the above configuration, effects similar to the effects of the connector of the second embodiment can be obtained. Further, with the configuration, it is possible to promote the movement of a water droplet C of condensation adhering to the plated portion 130 in a direction away from the non-plated portion 32. Accordingly, it is possible to restrain moisture from adhering to the periphery of the non-plated portion 32.

Fourth Embodiment

Figure 5:
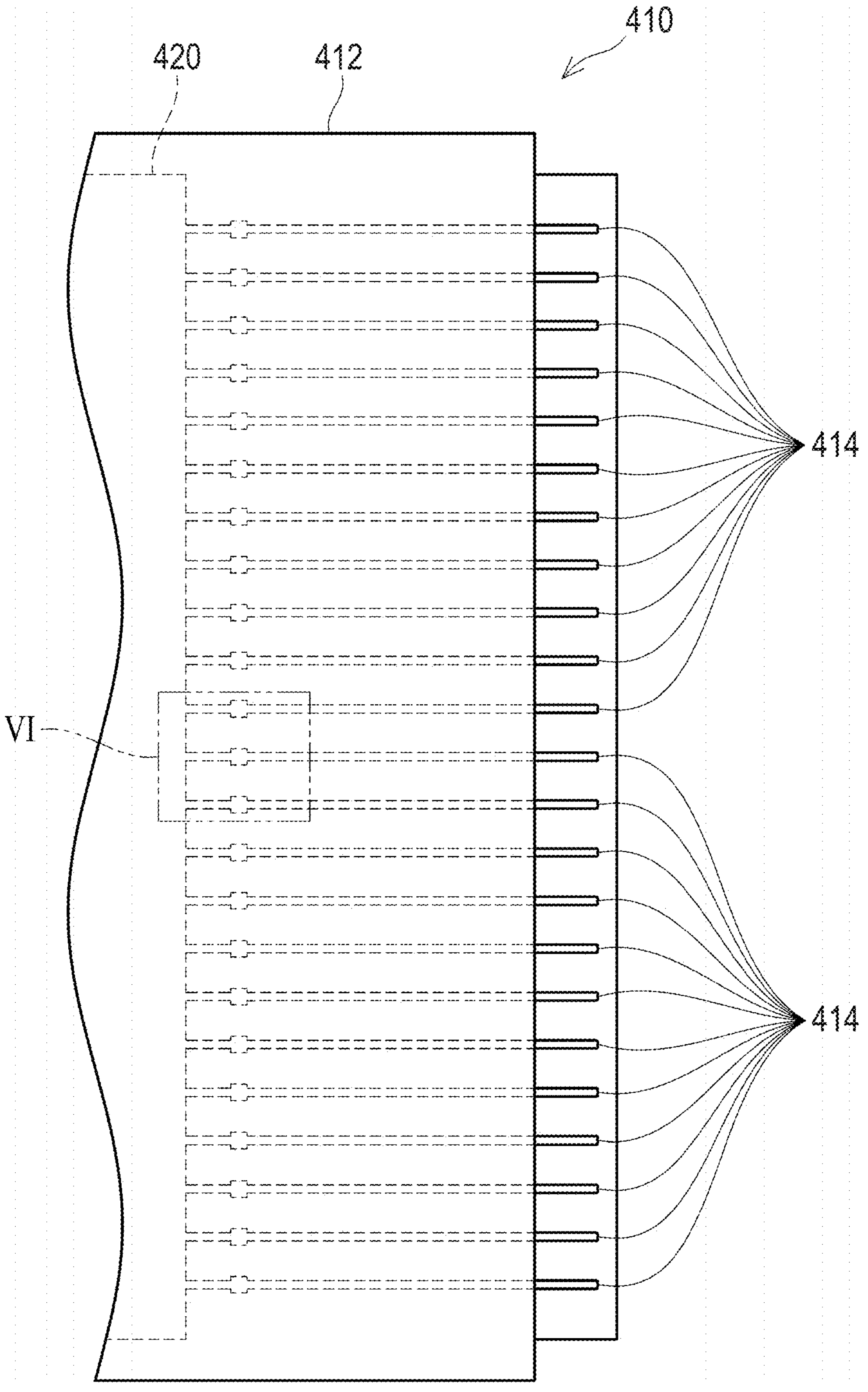
FIG. 5 is a plan view of a connector of a fourth embodiment.

Differences from the first embodiment will be mainly described. As shown in FIG. 5, a connector 410 of the present embodiment includes a cover 412, a plurality of terminals 414, and a base 420. The cover 412 has the same configuration as cover 12.

The terminals 414 have the same configuration as each other. The terminals 414 are disposed side by side at regular intervals. Similar to the terminal 14, the terminal 414 includes a plated portion 430 similar to plated portion 30 and a non-plated portion 432 similar to non-plated portion 32. However, the position of the non-plated portion 432 with respect to the plated portion 430 in a longitudinal direction of the terminal 414 is different from the position of the non-plated portion 32 with respect to the plated portion 30 in the longitudinal direction of the terminal 14. The base 420 differs from the base 20 in that the partition walls 22 are not disposed, and other configurations of the base 420 are the same as configuration of the base 20.

The terminals 414 are connected to a board (not shown) in a state of being held by the base 420. The terminals 414 are fixed by being press-fitted into the base 420.

Figure 6:
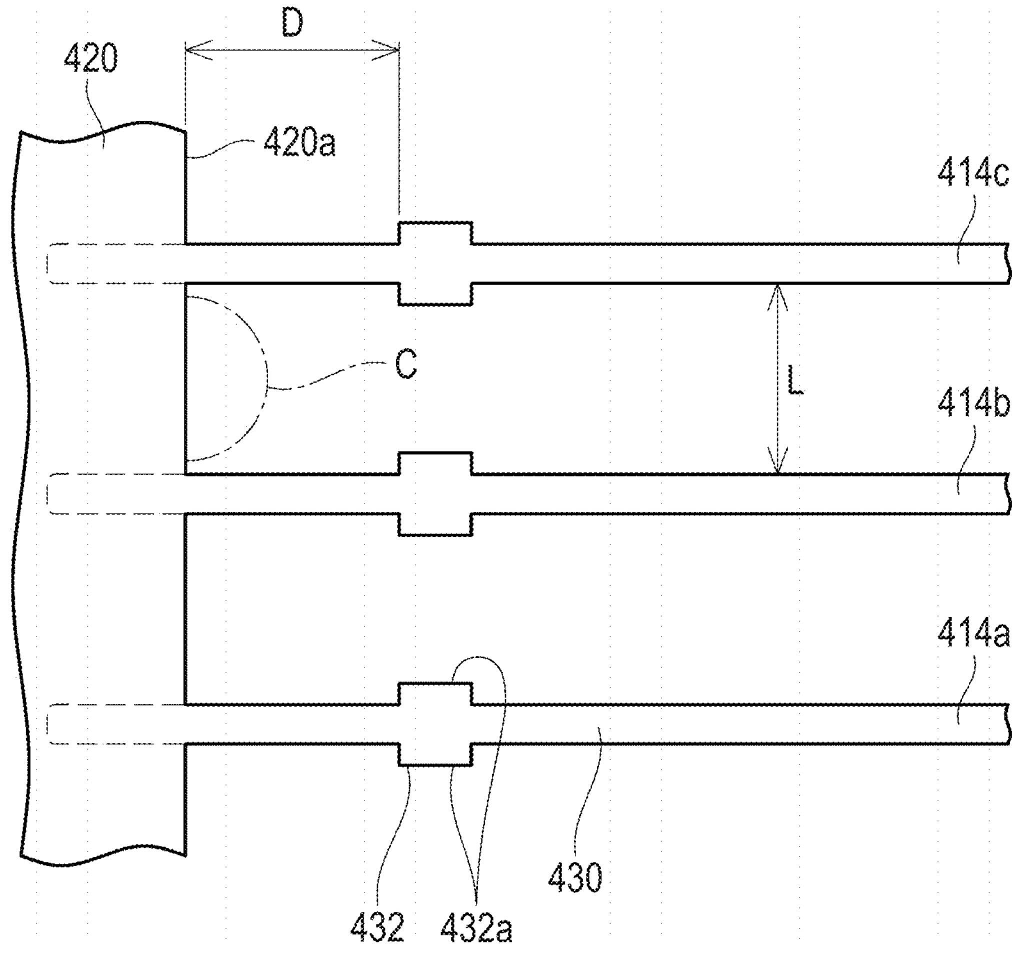
FIG. 6 is an enlarged view of a region VI of FIG. 5.

FIG. 6 shows an enlarged view of three terminals 414*a*, 414*b*, 414*c* around a surface 420*a* of the base 420, among the terminals 414. In addition, hereinafter, when each terminal 414 of the terminals 414 is described, the terminal is represented as "terminal 414", and when specifying one of the terminals 414*a*, 414*b*, 414*c*, is described, the terminal is represented as "terminal 414*a*", "terminal 414*b*", or "terminal 414*c*".

The non-plated portion 432 is disposed at a position separated by a distance D from the surface 420*a* of the base 420. The non-plated portion 432 is entirely exposed from the base 420. Therefore, both end surfaces 432*a* of the non-plated portion 432 are completely exposed from the base 420. The distance D is greater than an interval L.

With the above configuration, even when water droplets due to condensation adhere to the surface 420*a* of the base 420, it is possible to restrain the water droplets from reaching the non-plated portion 432.

Further, even when a water droplet C of condensation adhering to the surface 420*a* has a hemispherical shape with a diameter of the interval L, the distance D from the surface 420*a* to the non-plated portion 432 is two times or more the maximum height of the water droplet C. Accordingly, it is possible to restrain water droplets from contacting the non-plated portion 432.

Fifth Embodiment

Figure 7:
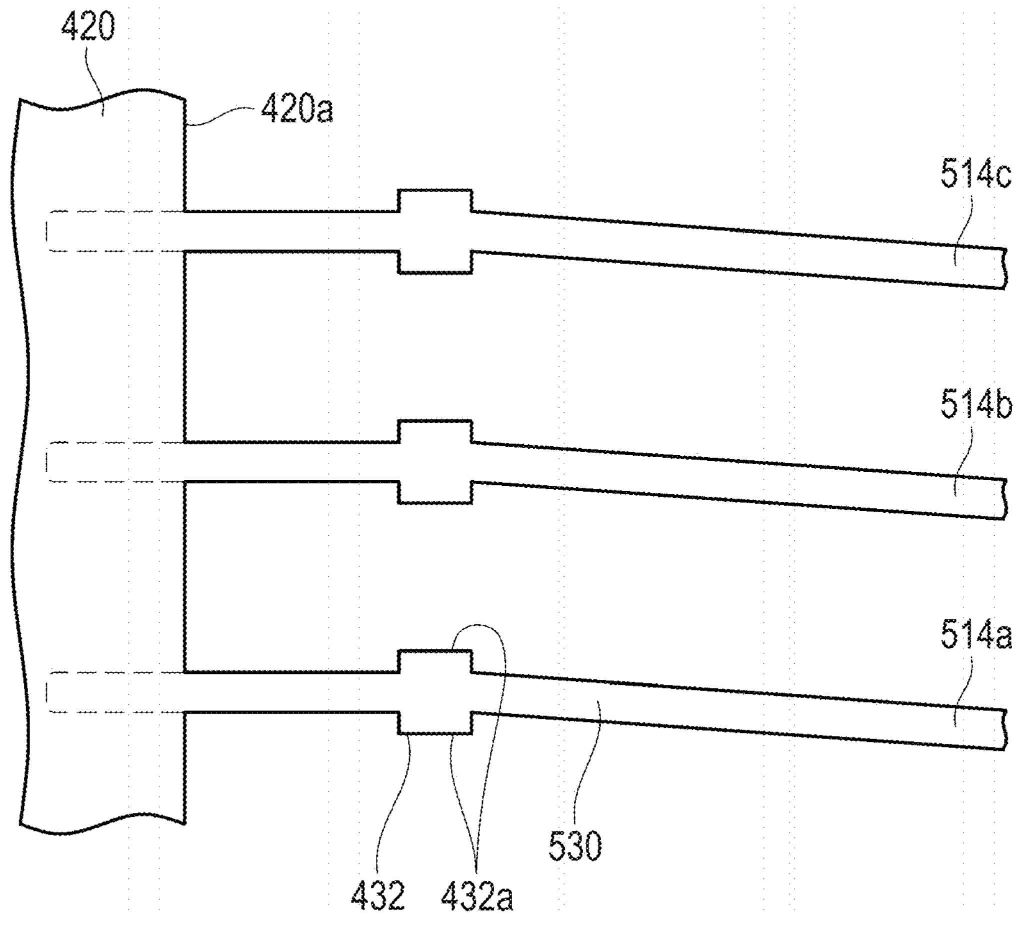
FIG. 7 is an enlarged view of a region II of a connector of a fifth embodiment.

As shown in FIG. 7, in a connector of the present embodiment, a plurality of terminals 514 is disposed in place of the terminals 414 as compared with the connector of the fourth embodiment. The terminal 514 includes a non-plated portion 432, which is similar to the non-plated portion of the terminal 414, and a plated portion 530 extending from each of both ends of the non-plated portion 432 in a longitudinal direction of the terminal 514. The plated portion 530 extends obliquely with respect to the base 420. In FIG. 7, the portion of the plated portion 530 that is further away from the base 420 than the non-plated portion 432 gets inclined downward as the distance from the non-plated portion 432 increases. The same goes for all terminals 514 disposed in the connector, including terminals 514*a*, 514*b*, 514*c*. Other configurations are the same as the configurations of the connector of the fourth embodiment.

With the above configuration, effects similar to the effects of the connector of the fourth embodiment can be obtained. Further, with the configuration, as with the connector of the third embodiment, it is possible to promote the movement of the moisture of condensation adhering to the plated portion 530 in a direction away from the non-plated portion 432. Accordingly, it is possible to restrain moisture from adhering to the periphery of the non-plated portion 432.

Although specific examples of the present disclosure have been described in detail above, things described above are merely examples and do not limit the scope of claims. The techniques described in the claims include various modifications and changes of the specific examples illustrated above.

For example, in the fourth and fifth embodiments, two adjacent terminals (e.g., the terminal 414*a* and the terminal 414*b*) may have different distances from surface 420*a* of the base 420. With the above configuration, it is possible to increase the distance between the non-plated portions of two adjacent terminals. For example, the terminal 414*a* may have a portion of the non-plated portion 432 buried in the base 420, similar to the terminal 14*a*.

In the first to third embodiments, the partition wall 22 of the base 20 may not be disposed.

In the third embodiment, the covering portion 50 may not be disposed.

The technical elements described in the present disclosure or in the drawings exhibit their technical usefulness alone or in various combinations, and are not limited to the combinations described in the claims at the time of filing. In addition, the techniques exemplified in the present disclosure or the drawings can achieve a plurality of purposes at the same time, and achieving one of the purposes itself has technical usefulness.

What is claimed is:

1. A connector comprising:
- a base; and
- a plurality of terminals held by the base and protruding from a surface of the base, the terminals being disposed to be spaced apart from each other, wherein:
- each of the terminals includes
  - a plated portion in which a base material is covered with a film, and
  - a non-plated portion in which the base material is not covered with a film;
- the non-plated portion is disposed within the base;
- a portion of the non-plated portion is exposed from the surface of the base; and
- the base includes a partition wall that protrudes from the surface of the base between two adjacent terminals among the terminals.

2. The connector according to claim 1, wherein a height of the partition wall from the surface of the base is equal to or greater than a distance between the two adjacent terminals.

3. The connector according to claim 1, wherein
- a width of the partition wall gradually narrows as the partition wall extends in a longitudinal direction thereof further away from the base, and
- a tip of the partition wall is formed with a curved surface.

4. The connector according to claim 1, further comprising a resin covering portion that is disposed on the surface of the base and covers a portion of the non-plated portion exposed from the surface of the base.

5. The connector according to claim 1, wherein in each of the terminals, the plated portion gets inclined downward at a portion that is further away from the base than the non-plated portion.

6. The connector according to claim 1, wherein the plated portions of the terminals extend, along a longitudinal direction thereof, obliquely with respect to the surface of the base from which the terminals protrude.

7. The connector according to claim 1, wherein the film is made of a metal.

8. The connector according to claim 7, wherein the metal is selected from the group consisting of gold (Au) and nickel (Ni).

9. The connector according to claim 7, wherein
- the plated portions of the terminals extend obliquely with respect to the surface of the base from which the terminals protrude, and
- the partition wall extends from the same surface of the base, in a same direction as and obliquely with respect to the two adjacent terminals between which the partition wall is arranged.

10. The connector according to claim 7, wherein, in each of the terminals,
- along a longitudinal direction of the terminal,
  - the non-plated portion has a first portion, and a second portion, and
  - the terminal has a first end, and a second end opposite to the first end,
- in a lateral direction perpendicular to the longitudinal direction of the terminal, both the first portion and the second portion of the non-plated portion are wider than the plated portion,
- the first portion of the non-plated portion and the first end of the terminal are buried in the base, and the second portion of the non-plated portion and the second end of the terminal are outside the base.

11. The connector according to claim 10, wherein, in each of the terminals, the base material is exposed at end surfaces of the second portion of the non-plated portion outside the base.

12. The connector according to claim 10, wherein, for a terminal among the terminals, the connector further comprises a resin covering portion that is disposed on the surface of the base, from which the terminal protrudes, and covers the second portion of the non-plated portion outside the base.

13. The connector according to claim 10, wherein, in each of the terminals, the plated portion extends from the second portion of the non-plated portion, obliquely with respect to both the second portion of the non-plated portion and the surface of the base, from which the terminal protrudes.

14. The connector according to claim 13, wherein a width of the partition wall gradually narrows as the partition wall extends in a longitudinal direction thereof further away from the base, and a tip of the partition wall is formed with a curved surface.

15. A connector comprising:

a base; and a plurality of terminals held by the base and protruding from a surface of the base, the terminals being disposed to be spaced apart from each other, wherein:

each of the terminals includes a plated portion in which a base material is covered with a film, and a non-plated portion in which the base material is not covered with a film; and the non-plated portion is disposed to be spaced apart from the base.

16. The connector according to claim 15, wherein a distance from the surface of the base to the non-plated portion is equal to or greater than a distance between the non-plated portions of the two adjacent terminals.

17. The connector according to claim 15, wherein in each of the terminals, the plated portion gets inclined downward at a portion that is further away from the base than the non-plated portion.

18. The connector according to claim 15, wherein the plated portions of the terminals extend, along a longitudinal direction thereof, obliquely with respect to the surface of the base from which the terminals protrude.

19. The connector according to claim 15, wherein the film is made of a metal.

20. The connector according to claim 15, wherein the metal is selected from the group consisting of gold (Au) and nickel (Ni).

* * * * *